United States Patent [19]

Mizutani et al.

[11] 4,220,292
[45] Sep. 2, 1980

[54] PHOTOGRAPHY FILM SPOOL

[75] Inventors: Shigemitsu Mizutani; Masao Tsuruta; Yasuo Matsumoto; Kengo Ono, all of Minami-ashigara, Japan

[73] Assignee: Fuji Photo Film Co., Ltd., Minami-ashigara, Japan

[21] Appl. No.: 11,827

[22] Filed: Feb. 13, 1979

[30] Foreign Application Priority Data

Feb. 14, 1978 [JP] Japan ............................ 53-17374[U]

[51] Int. Cl.³ ........................................... B65H 75/18
[52] U.S. Cl. ................................................. 242/71.8
[58] Field of Search ....................... 242/71.8, 71, 71.1, 242/71.2, 74, 76, 68, 68.5, 68.6; 226/193

[56] References Cited

U.S. PATENT DOCUMENTS

| | | | |
|---|---|---|---|
| 2,477,010 | 7/1949 | Schmidt | 242/71.8 |
| 3,253,758 | 5/1966 | Horiuchi | 226/193 X |
| 3,297,155 | 1/1967 | Gattenby et al. | 242/68 |

Primary Examiner—John M. Jillions
Attorney, Agent, or Firm—Sughrue, Rothwell, Mion, Zinn and Macpeak

[57] ABSTRACT

A spool for a 35 mm photography film of plastic material with parts of the outer surface of a winding shaft thereof brought into contact with the film being matted. The parts matted have a surface roughness in the range of 5 to 15 Hmax ($\mu$).

8 Claims, 3 Drawing Figures

PHOTOGRAPHY FILM SPOOL

BACKGROUND OF THE INVENTION

This invention relates to spools for 35 mm photography film, and more particularly to an improvement of a spool for 35 mm photography film in which parts of the outer surface of the winding shaft thereof which are brought into contact with the film are matted. This prevents the production of static marks on the film surface due to static electricity.

In the manufacture of a 35 mm photography film, the film is first wound on a spool and is then loaded into a cartridge. The spools while similar on the outside are different from one another in internal construction. For instance, the locking mechanism for locking photography films depends on the spool manufacturer. However, the spools are substantially equal in external configuration for camera compatibility. The spool material is generally plastic, for instance, styrene resin. The spool is molded as one unit by an injection molding machine or the like.

However, the conventional spool thus manufactured is disadvantageous for the following reasons: In the case where a photography film, especially a highly sensitive photography film, is wound on the conventional spool at high speed, dot-shaped static marks due to static electricity are produced on the lateral edge portions 4F (indicated by the oblique lines in FIG. 2), including perforations P, of the photography film F which are brought into contact with the outer surface of the winding shaft of the spool. That is, the outer surfaces 4 of both end portions of the winding shaft 3 extending between flanges 2 of the spool 1 in FIG. 1 are in contact with the film.

It is generally accepted that the static marks are produced when, in the case where the photography film wound on the spool is inserted into a cartridge, the film tightly wound around the outer surface of the spool winding shaft is unwound to an extent because of the elasticity of the film. Hence, the film will abruptly leave the outer surface of the spool winding shaft. Stated differently, since the spool and the photography film are made of plastic material which is readily electrically charged, if high speed winding is accomplished, the contact surfaces of the spool and the film are strongly and quickly rubbed with each other. As a result, a high potential static electricity is produced between the contact surfaces, and this produces static marks on the photography film, especially the highly sensitive type.

Because of the above-described reasons, with the conventional spools, it is difficult to improve the efficiency of manufacturing photography film, for example by an increase of winding speeds.

SUMMARY OF THE INVENTION

Accordingly, an object of this invention is to provide a spool for a photography film in which the above-described drawbacks accompanying conventional spools have been eliminated.

It is a further object of this invention to provide a spool usable such that, even if a photography film is wound thereon at high speed, no static marks are produced on the film.

These objects can be achieved by matting the film-contacting surface of the winding shaft of the spool. The details of the spool according to this invention will become apparent from the following embodiment of the invention as shown in the accompanying drawings and described in the description of the preferred embodiment.

DESCRIPTION OF THE PREFERRED EMBODIMENT

Figure 1:
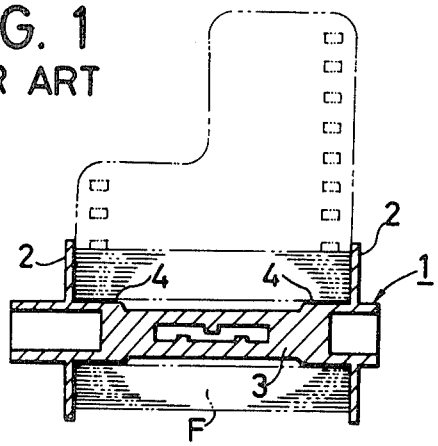
FIG. 1 is a sectional view showing a conventional spool.
Figure 2:
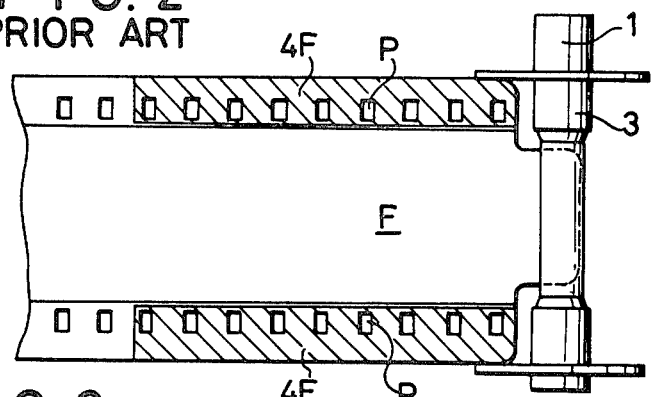
FIG. 2 is a plan view showing the positions of static marks produced on a photography film with the conventional spool.
Figure 3:
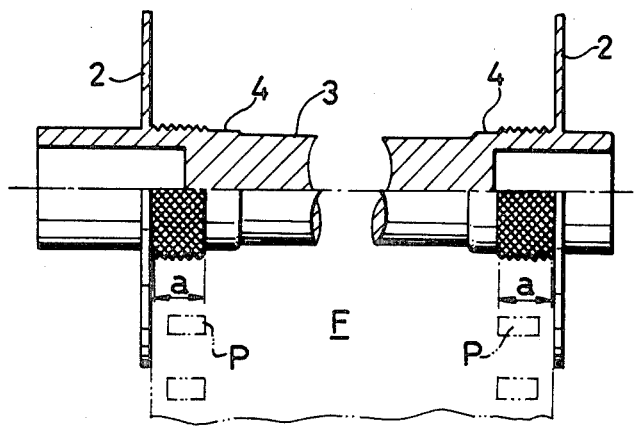
FIG. 3 is a sectional view showing a spool according to this invention.

Referring now to FIG. 3, a side cut-away view shows one example of a spool according to this invention. This spool is obtained by modifying the conventional spool 1 in such a manner that parts 4 of a winding shaft 3 extending between flanges 2 of the spool 1 (which parts are brought into surface contact with a photography film F) are made in the form of a mat. More specifically, each of the parts 4 is matted over a distance a from the respective flange 2. The mat surface roughness is in the range of 5–15 Hmax ($\mu$), preferably 8–12 Hmax ($\mu$). The distance a (usually 7–8 mm) may be equal to the length of the part 4 which is brought into contact with the photography film F. However, it is preferable, in view of the influence on the picture region of the photography film F, that the distance a be set to about 4–5 mm which is the distance between the edge of the photography film F and the inner edge of the perforation P as shown in FIG. 3. The mat surface roughness is determined by taking into account the amount of charge produced between the photography film F and the spool 1 and the degree of occurrence of scratches.

According to the experiments performed by the inventors, it has been determined that if the surface roughness is set to 4 Hmax or less, no scratches will be made on the photography film F, but the degree of production of static marks is increased. If the surface roughness is set to 16 Hmax or more, the photography film F does not suffer from the production of static marks, but is severely scratched. Thus, values of surface roughness outside these limits are not practical.

The outer surface of the winding shaft 3 may be matted by various methods, for instance, sand blasting. However, in general, a method is employed in which a metal mold for molding the spool is provided and the predetermined parts have a predetermined surface roughness. Hence, simultaneously with the molding of the spool, the winding shaft is matted. This method contributes to the simplification of manufacturing the spool and to a reduction of manufacturing cost.

As is apparent from the above description, the outer surface of the spool winding shaft which is brought into contact with the photography film is matted to be rough. Therefore, the quantity of charge between the winding shaft and the film is smaller than the quantity of charge of a spool with a winding shaft having a smooth surface. Furthermore, since the spool outer surface forms needle-like electrodes with the mat, the discharge energy which is caused when the photography film is unwound is dispersed. Therefore, even if a highly sensitive photography film is wound on the spool, unlike the conventional spool, the spool according to this invention never produces static marks on the photography film wound thereon. These effects of the invention will become more apparent from the following example:

EXAMPLE

A spool for a 35 mm photography film of styrene resin was improved so that the outer surface of the winding shaft which is brought into contact with the film was matted to have a surface roughness of 10 Hmax ($\mu$). This improved spool and a conventional spool (the outer surface of the wind shaft being smooth) were used to wind ASA 400 35 mm photography films with the same film winder in a dark room, 22° C. in room temperature and 65% in humidity. With the conventional spool, the static marks were produced when the winding speed was 20 m/min or higher. On the other hand, with the improved spool, the photography film was not affected at all even if the winding speed was increased to 80 m/min.

As described above, with the spool according to this invention, a photography film, especially a high sensitive photography film, can be wound without producing static marks. Therefore, the efficiency of a film winding process in the manufacture of photography films can be considerably increased according to this invention

What is claimed is:

1. A spool for 35 mm photography film comprising: a circular elongated shaft having two outer shoulder portions of the same diameter and a center portion of smaller diameter than said shoulder portions, said shoulder portions having their outer surfaces provided with a mat surface means for contacting a photographic film wound on the spool and for preventing the production of the static marks on the film surface in contact with said mat surface means.

2. The spool of claim 1 wherein said mat surface has a surface roughness in the range of 5 to 15 Hmax ($\mu$).

3. The spool of claim 1 wherein said mat surface has a surface roughness in the range of 8 to 12 Hmax ($\mu$).

4. The spool of claims 1, 2 or 3 further comprising a photographic film wound thereon, and wherein said film has perforations along its sides, and said mat surface means extends on each shoulder portion a distance from the edge of said film to the inner edge of said perforations.

5. The spool of claim 4 wherein said distance is in the range of 7 to 8 mm.

6. The spool of claim 4 wherein said distance is in the range of 4 to 5 mm.

7. A plastic spool and photographic film assembly comprising:
a spool having a circular elongated shaft with two outer shoulder portions of the same diameter and a center portion of smaller diameter than said shoulder portions;
a photographic film wound on the spool such that the photographic film surface contacts the outer shoulder portions; and
mat surface means on each of the shoulder portions for contacting the photographic film surface and for preventing the production of static marks on the film surface when the film is unwound from the spool.

8. A method of preventing the formation of static electricity marks on the surface of a photographic film which has been wound on a plastic spool at high speed, the spool having enlarged shoulder portions on opposite ends thereon in contact with the film surface, the method comprising forming a mat surface on each of the shoulder portions so that, when the film is suddenly unwound from the spool, the static electricity will be dispersed so as not to produce static marks on the photographic film.

* * * * *